3,006,861
LEAK DETECTOR FLUID

Myron E. Browning and Clarence J. Kastrop, Fort Worth, Tex., assignors to General Dynamics Corporation (Convair Division), San Diego, Calif., a corporation of Delaware
No Drawing. Filed Oct. 4, 1957, Ser. No. 688,120
3 Claims. (Cl. 252—408)

The present invention relates generally to fluid media for detecting leaks in a liquid container and more particularly to an improved composition of material useful as a simulating medium in connection with the testing for leaks in liquid containers, when the parent liquid, i.e., the liquid for which the container is designed, is toxic, flammable, or otherwise undesirable for use as a testing medium.

The liquid composition of the present invention is adapted to simulate the leakage characteristics of fluids, such as gasoline, aircraft turbine and jet engine fuels, rocket fuels, liquified petroleum gases, and other flammable and/or toxic liquids, hereinafter called fuel. The present invention is preferably used in the simulation of those fuels which are in the viscosity range of from 0.3 to 1.3 centistokes and having a surface tension range of from 15 to 12 dynes/cm.

Conventional gases and liquids generally employed for leak detection in fuel containing structures include helium, ammonia, water, and others but none of these media simulate the leakage characteristics of fuel, and in many cases the substitute is as undesirable as the fuel itself, because of its toxic or flammable properties. Therefore, the most conventional method for leak detection of fuel containers resides in the use of the fuel itself, regardless of its very undesirable character of being toxic, flammable, and relatively expensive. A desideratum in fuel container leakage testing is to employ a fluid that is economical, non-toxic, non flammable, and one that will readily locate and mark any flaw in the container that would be capable of passing the particular fuel for which said container is designed.

It is therefore a primary object of the present invention to provide an improved and safe solution that is well adapted for the detection of leaks in fuel containers.

Another object of the invention is the provision of a liquid composition that satisfactorily simulates the leakage properties of fuel.

A further object of the invention is to provide a liquid that possesses leakage capabilities equivalent to those of fuel, yet is void of those properties or characteristics that render it unsatisfactory or dangerous to workmen in the vicinity or that make it unsafe to store in either open or closed areas.

Still another object of the invention is the provision of a composition that is a satisfactory medium for the detection of fuel leaks, has no deleterious qualities such as being toxic or flammable, and that will mark any flaw, which would allow leakage of fuel, in a manner that is readily detected.

Yet another object of the invention resides in a composition of the above class and character which is easily employed, simple to compound, ship, store, and when necessary recharge; and which safely, economically and efficiently fulfills its intended purpose.

Other objects and advantages of the present invention will become readily apparent to those skilled in the art from the following description which sets forth in detail procedures whereby the principle of the invention will be readily understood and the invention can be practiced.

The novel composition of the present invention, generally stated, comprises a water base solution containing a surface active agent (a surfactant), an anti-foam agent and a marker dye.

The surface active agent is employed to lower surface tension in the composition and water soluble polyalkylene glycol ethers are preferred for use for this purpose. An example of such an ether is trimethyl nonyl ether of polyethylene glycol, a commercially used name used by Union Carbide to describe the chemical formula of a product they market under the trade name Tergitol Nonionic TMN. Of course, other surface active agents may be used in producing an effective composition; among these other surfactants are water soluble salts of unsubstituted alkyls such as sodium heptadecyl sulfate; and ammonium salts of completely fluorinated carboxylic acids, i.e., perfluorocaprylic acid derivatives such as ammonium perfluorocaprylate. Water soluble alkyl aryl sulfonates are also suitable for use as the surfactant in the present composition.

The anti-foam agent serves as a control against possible turbulent liquid surface conditions and assists in the transpiration of the composition through the container being tested. An anti-foam agent which has been found useful is dimethyl polysiloxane which has been thickened to a thin paste condition with finely divided silica. Anti-foam agents of the branched chain alcohol type may also be used, an example being 2-ethyl-hexanol.

The dye is used to permit ready location of the point or points of leakage should such defects be present in the container being tested. For ease in more readily noting the existence of leakage points the container may be enshrouded with a suitable material such as soft finish white paper or cloth. Another suitable leakage point detection aid is an adherent dried film covering for the container as may be obtained from a dispersion of a material with good dye absorption properties such as clay, talc or chalk. With such a covering detection of any transpiring fluid is obviously simplified. Any suitable water soluble dye may be employed which is compatible with the other ingredients of the composition. Water soluble cationic dyes have been found to be suitable. If desired, a rhodamine dye such as the ethyl ester of diethylrhodamine (Rhodamine 6G) also may be used.

It is preferred that distilled water be employed as the base of the present composition in which the other ingredients are dissolved. However, effective though less efficient, compositions may be obtained if demineralized or de-ionized water or even tap water is used.

To simulate leakage characteristics of fuels having viscosities of from 0.3 to 1.3 centistokes and surface tensions of from 15 to 72 dynes/cm. a water base solution is prepared with composition and component limits as follows:

|   | Gms./liter |
|---|---|
| (a) Surface active agent | .1 to 20 |
| (b) Anti-foam agent | .005 to 8 |
| (c) Marking dye | .01 to 2 |
| (d) Water | Remainder. |

In use the present composition is maintained at that temperature which will cause the viscosity of the composition to be substantially the same as the viscosity of the fuel which is to be simulated. Since the viscosity of the fuel will be known it is a simple matter to calculate the appropriate adjustment of temperature which will change the viscosity of the water so that there is simulation of the fuel viscosity.

The following specific composition is representative of the invention:

|  | Gms./liter |
|---|---|
| (a) Trimethyl nonyl ether of polyethylene glycol | 5 |
| (b) Dimethyl polysiloxane with silica | .005 to .05 |
| (c) Cationic dye | .5 to .7 |
| (d) Distilled water | Remainder. |

The above composition will serve to simulate the leakage characteristics of high octane fuel such as 115/145 aviation fuel when maintained at the temperature of 120° F.±10° F. At this temperature the viscosity of the present water base solution will be substantially the same as that of the fuel. It is also useful in simulating the leakage characteristics of JP-4 jet engine fuel except that here a different temperature is involved. The temperature in this instance should be maintained at 72°±10° F. The surface tension of this latter fuel is within the same order of magnitude as 115/145 fuel (measured by a Dunouy tensiometer), therefore the amounts of the surface active agent, the anti-foam agent and the marking dye remain the same. The viscosity of JP-4, however, is the same as that of water, and since the solution is water base, it should be maintained at room temperature, 72° F.±10° F.

Where the fuel container to be tested is made of rubber, although the cationic dye does provide a useful result, it may be preferable to use a rhodamine dye because of its more brilliant color. Accordingly, the above specific composition would be the same except that a rhodamine dye such as Rhodamine 6G is substituted for the cationic dye and in the quantity expressed. Both forms of dye are good from the standpoint of stability and good paper or cloth penetration.

The present invention exemplifies a liquid composition of material adapted particularly for use in connection with leak detection in fuel containers whereby the leakage characteristics of the fuel (undesirable for a leak testing medium because of such properties as flammability and toxicity) are simulated by a colored water base composition which is completely safe and satisfactory in connection with all working conditions, storage, and shipping.

Having thus described the invention, we claim:

1. An aqueous composition for simulating the leakage characteristics of liquid hydrocarbon fuels which are in the viscosity range of from 0.3 to 1.3 centistokes and in the surface tension range of from 15 to 72 dynes per centimeter consisting of from .005 to 8 grams per liter of 2-ethyl-hexanol, from .01 to 2 grams per liter of a water soluble dye, from .1 to 20 grams per liter of sodium heptadecyl sulfate, and the remainder being water.

2. An aqueous composition for simulating the leakage characteristics of liquid hydrocarbon fuels which are in the viscosity range of from 0.3 to 1.3 centistokes and in the surface tension range of from 15 to 72 dynes per centimeter consisting of from .005 to 8 grams per liter of 2-ethyl-hexanol, from .01 to 2 grams per liter of a water soluble dye, from .1 to 20 grams per liter of ammonium per fluorocaprylate, and the remainder being water.

3. An aqueous composition for simulating the leakage characteristics of liquid hydrocarbon fuels which are in the viscosity range of from 0.3 to 1.3 centistokes and in the surface tension range of from 15 to 72 dynes per centimeter consisting of from .005 to 8 grams per liter of 2-ethyl-hexanol, from .01 to 2 grams per liter of a water soluble dye, from .01 to 20 grams per liter of trimethyl nonyl ether of polyethylene glycol, and the remainder water.

References Cited in the file of this patent

UNITED STATES PATENTS

| 2,254,609 | Kinzer | Sept. 2, 1941 |
| 2,486,199 | Nier | Oct. 25, 1949 |
| 2,504,530 | Jacobs | Apr. 18, 1950 |
| 2,629,697 | Langdon et al. | Feb. 24, 1953 |
| 2,751,358 | Caviet | June 19, 1956 |
| 2,758,977 | Knowles et al. | Aug. 14, 1956 |
| 2,845,394 | Thompson | July 29, 1958 |
| 2,878,392 | Polito | Mar. 17, 1959 |
| 2,902,452 | Holzinger | Sept. 1, 1959 |
| 2,920,203 | Switzer et al. | Jan. 5, 1960 |

UNITED STATES PATENT OFFICE
CERTIFICATE OF CORRECTION

Patent No. 3,006,861　　　　　　　　　　　　　October 31, 1961

Myron E. Browning et al.

It is hereby certified that error appears in the above numbered patent requiring correction and that the said Letters Patent should read as corrected below.

Column 4, line 22, for "per fluorocaprylate" read -- perfluorocaprylate --; line 30, for ".01" read -- .1 --.

Signed and sealed this 10th day of April 1962.

(SEAL)
Attest:

ERNEST W. SWIDER　　　　　　　　　　　　　DAVID L. LADD
Attesting Officer　　　　　　　　　　　　　Commissioner of Patents